US008622430B2

(12) United States Patent
Letz et al.

(10) Patent No.: US 8,622,430 B2

(45) Date of Patent: Jan. 7, 2014

(54) BELT BUCKLE

(75) Inventors: Michael Letz, Borstel-Hohenraden (DE); Thomas Kubbe, Kaltenkirchen (DE)

(73) Assignee: Autoliv Development AB, Vårgårda (SE)

(*) Notice: Subject to any disclaimer, the term of this patent is extended or adjusted under 35 U.S.C. 154(b) by 87 days.

(21) Appl. No.: 13/002,679

(22) PCT Filed: Jun. 27, 2009

(86) PCT No.: PCT/EP2009/004666

§ 371 (c)(1), (2), (4) Date: Jan. 5, 2011

(87) PCT Pub. No.: WO2010/009798

PCT Pub. Date: Jan. 28, 2010

(65) Prior Publication Data

US 2011/0127760 A1 Jun. 2, 2011

(30) Foreign Application Priority Data

Jul. 25, 2008 (DE) ........................ 10 2008 034 958

(51) Int. Cl.
*B60R 22/26* (2006.01)
*B60R 21/02* (2006.01)

(52) U.S. Cl.
USPC ........................................ 280/801.2; 297/481

(58) Field of Classification Search
USPC ............ 280/801.2, 801, 801.1; 297/481, 468, 297/482, 331, 335
See application file for complete search history.

(56) References Cited

U.S. PATENT DOCUMENTS

| | | | | |
|---|---|---|---|---|
| 4,611,854 | A | 9/1986 | Pfeiffer | |
| 5,016,916 | A * | 5/1991 | Yokote et al. | 280/801.2 |
| 5,375,879 | A * | 12/1994 | Williams et al. | 280/749 |
| 5,855,047 | A * | 1/1999 | Haas | 24/684 |
| 5,908,223 | A * | 6/1999 | Miller | 297/484 |
| 6,428,044 | B1 * | 8/2002 | Ghantae | 280/748 |
| 6,665,911 | B1 * | 12/2003 | Huang | 24/68 CD |
| 7,497,474 | B2 * | 3/2009 | Sanchez et al. | 280/801.1 |
| 2006/0255647 | A1 * | 11/2006 | Hyatt et al. | 297/481 |
| 2007/0164596 | A1 | 7/2007 | Di Grande | |
| 2009/0072608 | A1 * | 3/2009 | Marriott et al. | 297/481 |
| 2011/0127760 | A1 * | 6/2011 | Letz et al. | 280/801.2 |

FOREIGN PATENT DOCUMENTS

| | | | |
|---|---|---|---|
| DE | 38 07 927 | A1 | 9/1989 |
| DE | 103 10 348 | A1 | 9/2004 |
| EP | 0 854 070 | A1 | 10/2001 |

OTHER PUBLICATIONS

PCT/EP2009/004666—International Search Report—Oct. 20, 2009.

* cited by examiner

*Primary Examiner* — Karen Beck
(74) *Attorney, Agent, or Firm* — Brinks Gilson & Lione

(57) ABSTRACT

A seat belt buckle (1) with a fastening fitting (2) for mounting in a motor vehicle has a retainer (5) permanently connected to the belt buckle (1) and a bolt (7) through which the retainer (5) is held rotatable with regard to the fastening fitting (2). A spring (6, 8) that impinges upon the belt buckle (1) in a rest position (R), has a supporting portion (65, 85), which restricts the rotational movement of the belt buckle (1) is restricted with regard to the fastening fitting (2).

8 Claims, 3 Drawing Sheets

P
1
63
61
5
7
4
62
6
2
65
3

61
60
6
63
W
65
62

64

BELT BUCKLE

CROSS REFERENCE TO RELATED APPLICATIONS

This application claims priority to German Patent Application No. 10 2008 034 958.5, filed Jul. 25, 2008 and PCT/EP2009/004666, filed Jun. 27, 2009.

FIELD OF THE INVENTION

The invention concerns a belt buckle with a fastening fitting for mounting in a motor vehicle.

BACKGROUND OF THE INVENTION

Belt buckles with a fastening fitting for mounting fixed to the vehicle are used to latch a belt tongue of a seat belt system that secures the passenger in a vehicle. To prevent the belt buckles, in particular on the rear seats, from interfering when not in use, they must be designed movably. In the event that a passenger sits on the belt buckle, the belt buckles can then move out of the way or retract.

In addition, it is important to design the belt buckle connection to the vehicle to be movable, because in the case of folding seats the belt buckles must be moved from the rest position or the use position into another position in which the belt buckles do not interfere with the movement of the rear seat or the rear seat back and/or cannot be damaged by the latter.

For example, a belt buckle is known from EP 0 854 070 B1 that can be moved in various directions, e.g. in the longitudinal direction of the belt buckle, rotatable around an axis crosswise to the vehicle's longitudinal direction and rotatable around an axis parallel to the vehicle's longitudinal direction. A resetting means designed as a spring is provided so that the belt buckle is moved back to a rest position after the deflection. To limit the resetting movement into the rest position a stopper is provided at the fastening fitting at which the retainer of the belt buckle is stopped in the rest position.

However, the disadvantage of this solution is that the resetting movement is braked relatively hard by the stopper when it comes to rest. In addition, the rest position itself can only be changed at great expense in that the stopper at the retainer is aligned differently, which necessitates a change to the punching tool.

The task of the invention is to create a belt buckle in which the above-mentioned disadvantages are avoided.

SUMMARY OF THE INVENTION

The basic idea of the invention can be seen in that the spring has a supporting portion and the rotational range of movement of the belt buckle with regard to the fastening fitting is restricted by the supporting portion. In this way a constructional possibility is created for generating the resetting movement itself and for restricting it with one and the same part. Because the resetting movement and its restriction can be realized with just one single part, the individual dimensioning of the resetting movement can be carried out individually in accordance with the specifications of the motor vehicle manufacturer simply through the design of the spring, without the fastening fitting and/or the retainer for the belt buckle having to be changed. In addition, the restriction of the resetting movement takes place through the spring, that is, cushioned accordingly.

It is proposed furthermore that the supporting portion is arranged between an abutment portion to be supported at the fastening fitting and an abutment portion to be supported at the retainer or the belt buckle. In this way it is ensured that the force transmission into the belt buckle, the retainer and/or the fastening fitting takes place defined through the abutment portions provided for this and the supporting portion can be designed solely on the basis of its task of carrying out the supporting function.

It is also proposed that the force transmission into the abutment portions takes place displaced laterally to the supporting portion. In this way, along with the compressive force a bending torque is applied to the supporting portion that strengthens the spring effect additionally on the restriction of the resetting movement.

To ensure that the force transmission takes place without disturbance and that the spring does not slip off on the abutment portions, it is proposed that the abutment portions are formed by portions of the spring running in a straight line transverse to the longitudinal extension of the belt buckle.

It is also proposed that the spring has a spiral section concluding at one of the abutment portions and surrounding the bolt that is supported with its other end at the belt buckle or the fastening fitting. In this way a simple solution is created for realizing both the expensive rotatory resetting movement and the restriction of the resetting movement with a single spring.

The supporting portion can be arranged laterally offset to the winding axis of the spiral portion so that the winding of the spiral portion and the shaping of the supporting portion can take place in a single die.

In order for the belt buckle to be held through the supporting portion in the rest position as defined, it is proposed that the supporting portion is aligned in the longitudinal direction of the belt buckle. Through the proposed alignment of the supporting portion the latter is able to carry out its supporting function optimally and function in addition as a resetting means in the longitudinal direction of the belt buckle for a retracting belt buckle, or as a resetting means around an axis transversely to the axis of the bolt.

The invention is explained in more detail below by means of two preferred embodiments.

DETAILED DESCRIPTION OF THE INVENTION

Figure 1:
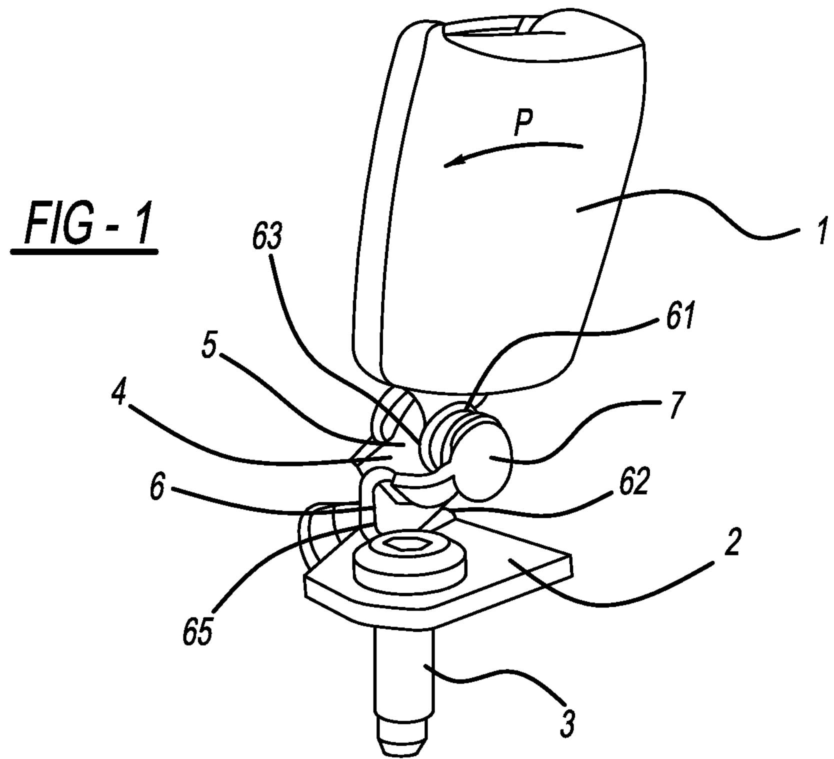
FIG. 1 shows a belt buckle with spring and supporting portion.

A belt buckle 1 with a fastening fitting 2 and a fastener screw 3 for fixing permanently to the vehicle can be seen in FIG. 1. The belt buckle 1 is part of a seat belt system for restraining a passenger in a motor vehicle, and is used to lock a belt tongue that is mounted at the end of a belt or sliding on a belt.

The belt buckle 1 is held via a retainer 5 rotatable on one of the bolts 7 located at the fastening fitting 2. In addition, a spring 6 is provided that is hooked with one end 62 at the fastening fitting 2 and with the other end 61 at the belt buckle 1. The spring 6 exercises a resetting force in the direction of the rest position or the presenting position of the belt buckle 1, in which the insertion slot of the belt buckle 1 is released and the user can insert the belt tongue. In case the belt buckle 1 is mounted on the rear seat of the vehicle and the rear seat and/or the back of the rear set can be folded, the belt buckle 1 can pivot into a position in which it can neither be damaged by the folded rear seat/rear seat back nor hinder the seat's pivoting movement. When the rear seat/rear seat back is folded back, the belt buckle 1 then pivots automatically back into the rest position under the influence of the resetting force. To restrict the resetting movement in the direction of the arrow "P" the spring 6 has a supporting portion 65 that stops further movement by applying a catch 4 allocated to retainer 5.

Figure 2:
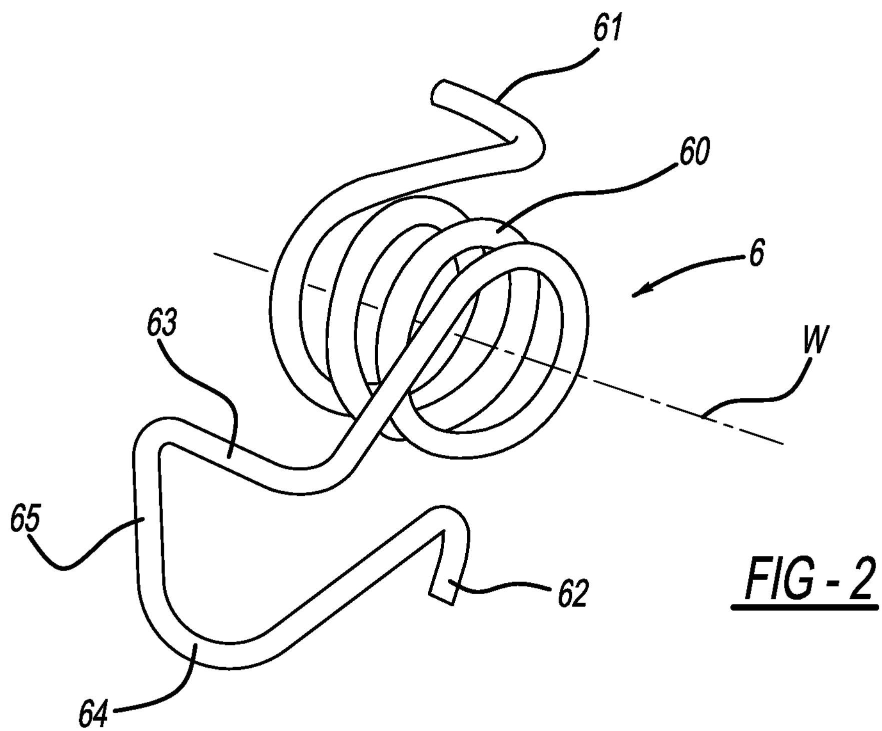
FIG. 2 shows a spring with supporting portion and spiral portion.

For better comprehension, spring 6 is shown in detail in FIG. 2. Starting from the end 61 hooked onto belt buckle 1, spring 6 is initially wound in a spiral portion 60 that is entwined around bolt 7. Adjacent to spiral portion 60 is an abutment portion 63 that is in contact with the catch 4 in the rest position. Because the spring 6 exercises a spring force on the belt buckle 1 in the direction of the arrow "P" in the rest position as well, the position of the belt buckle 1 is clearly defined through the catch 4 and the abutment portion 63. A supporting portion 65 angled from the abutment portion 63 and aligned in the rest position roughly in the longitudinal direction of the belt buckle 1 is connected at the abutment portion 63. In the further course the spring 6 passes into another angled abutment portion 64 supported on fastening fitting 2 and ends finally in an end 62 hooked into the fastening fitting 2.

When the resetting movement generated by the spiral portion 60 takes place in the direction of the arrow "P", the catch 4 of the retainer 5 comes into contact with the abutment portion 63, which is supported laterally by the supporting portion 65. Because the supporting portion 65 itself is supported through the abutment portion 64 on the fastening fitting 2, the abutment portion 63 is also immobilized, and the resetting movement is restricted as a whole with a springy yielding of abutment portions 63 and 64 and also of the supporting portion 65. Because the supporting portion 65 is mounted to the side of the abutment portion 63, a bending torque is generated by this in the latter through which, with an appropriate construction, the flexibility of the whole system can be influenced. Through this, the invention creates noticeably the advantage that both the resetting movement itself and its restriction are defined solely through the spring 6. This means that this can be adapted to the requirements of the motor vehicle manufacturer very simply through the individual construction of the spring 6, without the other parts having to be altered. Because both functions are realized in the spring 6, the tolerance chain is reduced significantly in addition, so that the accuracy of the end stop is increased. The spring 6 can be constructed so that in the rest position it forces the belt buckle 1 without play against the abutment portion 63. Alternatively, a clearance can be provided deliberately in which the belt buckle 1 can be moved freely without the spring 6 impinging upon it.

Figure 3:
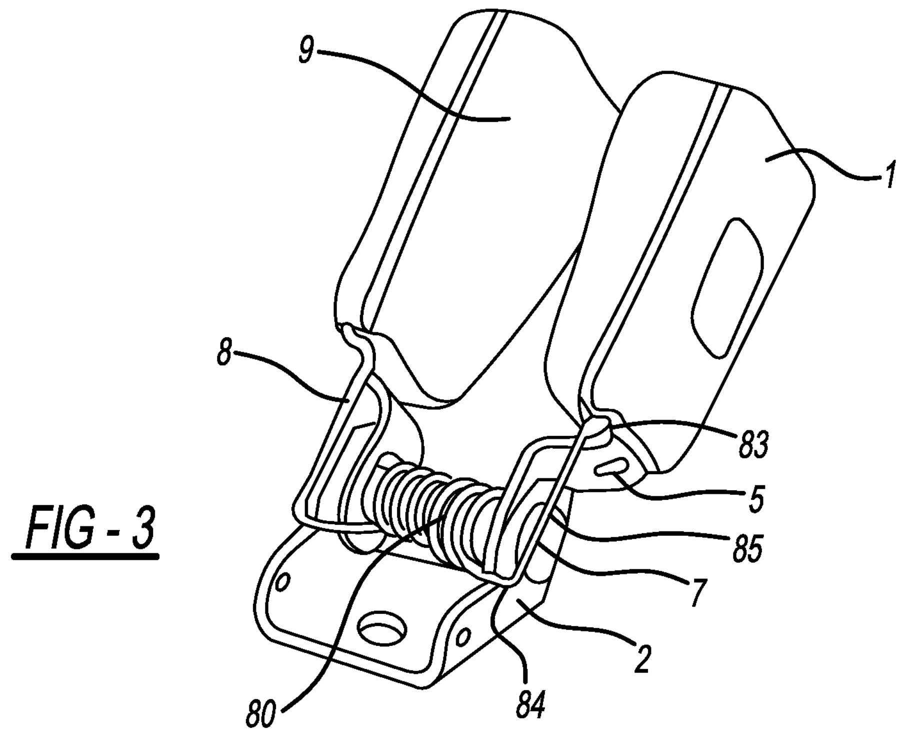
FIG. 3 shows a double belt buckle with spring and supporting portion.
Figure 4:
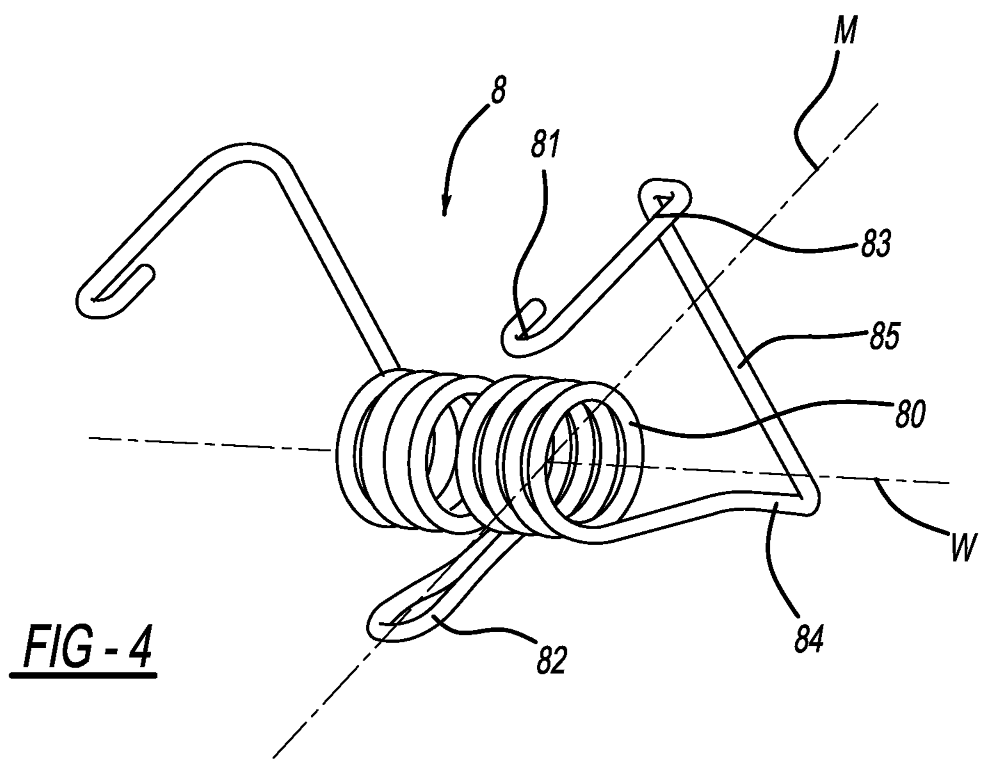
FIG. 4 shows a spring with two supporting portions and spiral portions.

FIGS. 3 and 4 show an alternative embodiment with two belt buckles 1 and 9 that are held on a common fastening fitting 2. The belt buckles 1 and 9 are held flexibly via a common spring 8 on a bolt 7 mounted between two standing arms of the fastening fitting 2, whereby the spring 8 is constructed noticeably symmetrically to its middle axis "M". The spring effect is therefore described by means of one side only, but is valid naturally for the other side as well. Conceptually the spring 8 can also be divided into two individual springs, whose ends 82 are connected and are supported on the fastening fitting 2. Starting from the end 82 that is not free here, the spring 8 is initially wound into a spiral portion 80 that is entwined round the bolt 70. The spiral portion 80 generates the spring force required to load the belt buckle 1 in the direction of the rest position. Insofar, the mechanism is described identically to that in FIG. 1.

In the further course of spring 8 the spring passes into a linear abutment portion 84, a linear supporting portion 85 aligned by the linear abutment portion 84 at an angle in the longitudinal direction of the belt buckle 1, and finally into an abutment portion 83 connecting to the belt buckle 1. To ensure that the spring 8 is secured in the position abutting the belt buckle 1, the spring is held at its end with a hook 81 at the retainer 5. In contrast to the embodiment in FIG. 1, the supporting portion 85 is not supported here in the retainer 5 but directly on the belt buckle 1. The restriction of the resetting movement then takes place through the abutment portion 84, which is raised in the deflected position of the belt buckle 1 by the fastening fitting 2 and comes into contact in the rest position with the fastening fitting 2, so that the supporting portion 85 prevents a further rotational movement. The supporting portion 85 is mounted at the side of the abutment portions 83 and 84, so that when the stop position is reached bending torques pass into the supporting portion and the belt buckle 1 can still deflect for a specific pivot angle.

The supporting portions 65 and 85 are mounted at the side of the winding axes "W" of the spiral portions 60 and 80, so that the designs of the supporting portions 65 and 85 and of the spiral portions are independent of one another and they can even be molded in a common molding process.

Figure 5:
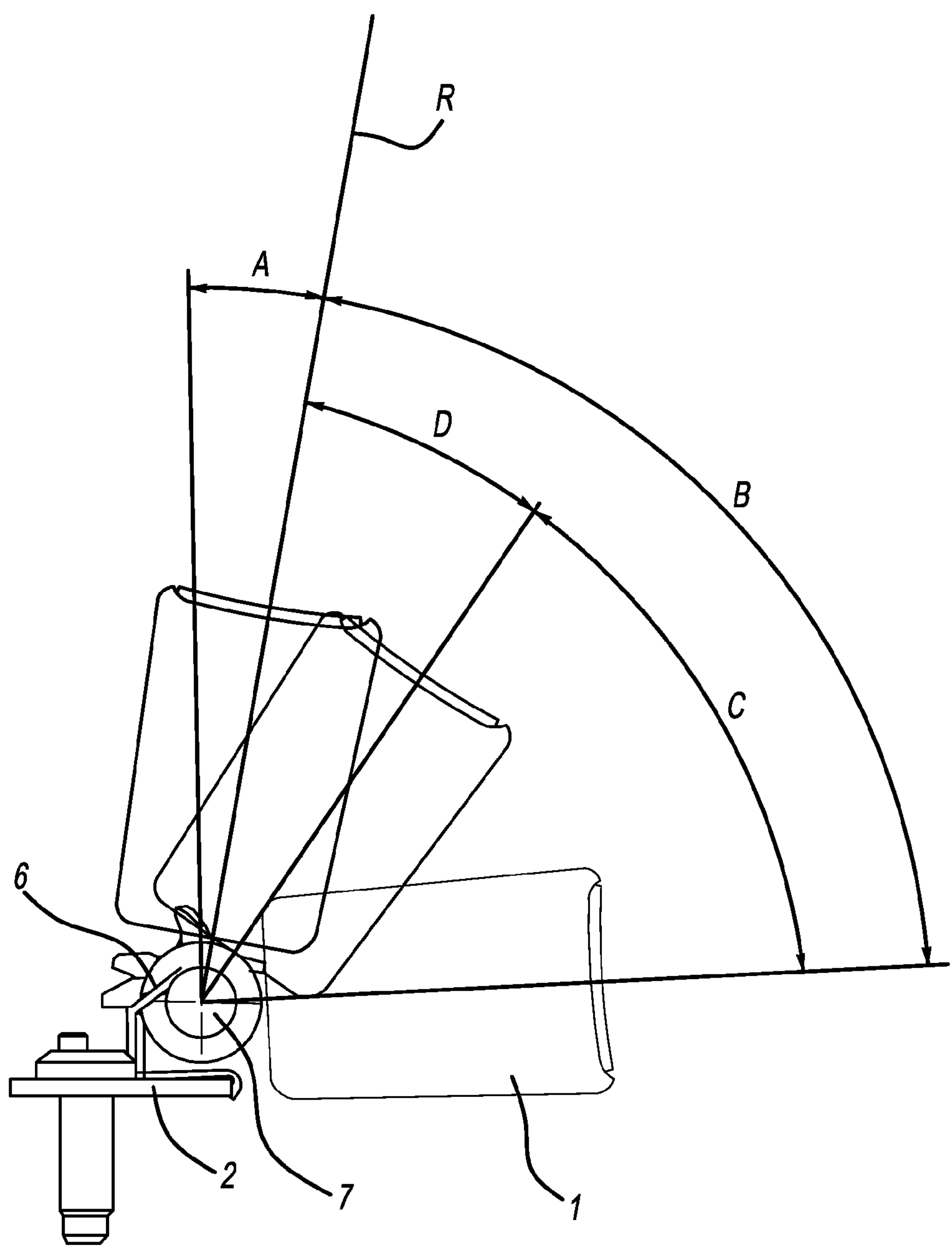
FIG. 5 shows a belt buckle with various pivoting ranges.

The different pivoting areas are described in FIG. 5 by means of the embodiments in FIG. 1. Starting from the rest position "R" the belt buckle 1 can be pivoted in a clockwise direction around the pivot angle "B", whereby an angle "D" is provided in which the belt buckle 1 is not impinged by the spring 6 and can move practically freely. The spring 6 is applied to the belt buckle in the pivot angle "C" and loads this in the direction of the rest position "R". The pivot angle "D", in which the belt buckle 1 is not spring-loaded, can be dimensioned in accordance with the requirements of the vehicle manufacturer, whereby it can also be zero. The resetting movement in a counter clockwise direction from the pivoting area "B" in the direction of rest position "R" is restricted through application of catch 5 at the abutment portion 63 in the rest position "R", but can be continued for reasons of comfort within a pivoting range "A" because of the deliberately created spring displacement, as described above.

While the above description constitutes the preferred embodiment of the present invention, it will be appreciated that the invention is susceptible to modification, variation, and change without departing from the proper scope and fair meaning of the accompanying claims.

The invention claimed is:

1. A belt buckle with a fastening fitting for mounting in a motor vehicle, comprising a retainer permanently attached to the belt buckle and a bolt, through which the retainer is held rotatable about the bolt in a fore-and-aft direction of the vehicle and with regard to the fastening fitting, and a spring that exerts a return force in a first fore-and-aft direction of the vehicle on the belt buckle, the spring having a supporting portion restricting rotational movement of the belt buckle about the bolt in the fore-and aft direction of the vehicle, wherein the supporting portion opposes the rotational movement caused by the return force in the first fore-and-aft direction of the vehicle when the belt buckle is in a rest position, and wherein the belt buckle comprises an insertion slot extending in the same general direction as the rotational movement.

2. The belt buckle in accordance with claim 1, wherein the supporting portion is arranged between two abutment portions, one of the abutment portions being supported on the fastening fitting and the other of the abutment portions being supported on the retainer or the belt buckle.

3. The belt buckle in accordance with claim 2, wherein the retainer includes a catch that provides a force transmission into the abutment portions, and the force transmission into the abutment portions takes place laterally offset to the supporting portion.

4. The belt buckle in accordance with claim 2, wherein the abutment portions are formed by sections of the spring running linearly crosswise to a longitudinal extension of the belt buckle defined by the direction in which a fastener is inserted.

5. The belt buckle in accordance with claim 2, wherein the spring has a spiral portion adjacent to one of the abutment portions and entwined around the bolt, which is supported with its other end at the belt buckle or the fastening fitting.

6. The belt buckle in accordance with claim 5, wherein the spiral portion defines a winding axis and the supporting portion is arranged laterally offset to the winding axis of the spiral portion.

7. The belt buckle in accordance with claim 1, having a longitudinal direction corresponding to the direction in which a fastener is inserted, wherein the supporting portion is aligned in the rest position of the belt buckle in the longitudinal direction of the belt buckle.

8. The belt buckle in accordance with claim 1, wherein the first fore-and-aft direction is rearward.

* * * * *